April 15, 1947.　　　J. E. ALLAN　　　2,419,105
ANTI-SKID DEVICE
Filed Aug. 18, 1945
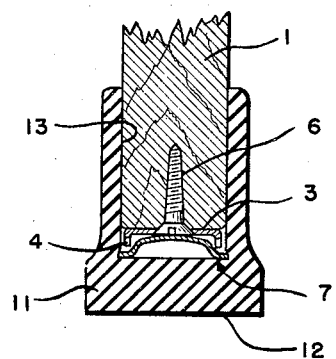
Fig. 2
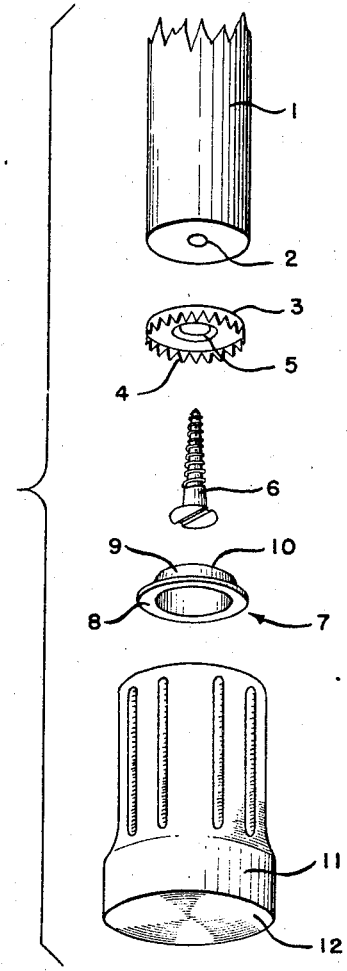
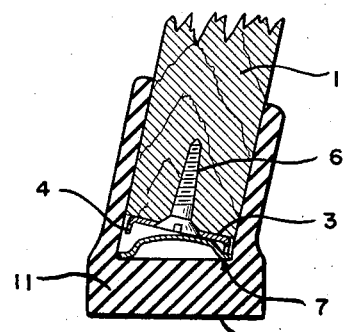
Fig. 3
Fig. 1
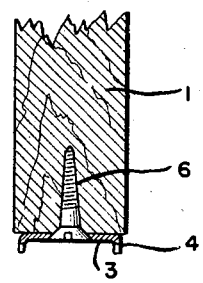
Fig 4
INVENTOR
JAMES E. ALLAN
BY
ATTORNEY Patented Apr. 15, 1947

2,419,105

UNITED STATES PATENT OFFICE 2,419,105

ANTISKID DEVICE

James E. Allan, Detroit, Mich., assignor to Frank Andrew Allan, Detroit, Mich.

Application August 18, 1945, Serial No. 611,331

3 Claims. (Cl. 135—54)

This invention relates to an anti-skid device and, in particular, it relates to a combination attachment to the base of a crutch, cane, or the like, constituting an anti-skid device.

Most crutches, canes, or the like, hereinafter referred to as "support," are provided with a rubber tip which serves as a cushion element and as a non-skid means when the support is in use on dry pavement or floor surface. When the supporting surface is slippery, such as when it is covered with ice or snow, the rubber tip does not usually afford adequate stability. Many attachments have been devised in order to provide anti-skid means; such devices, however, are either complicated or require removal of the rubber tip and the assembly with the support of a secondary attachment having anti-skid characteristics.

In accordance with the practice of my invention I provide a support to which is easily attached a permanent anti-skid fixture which functions in combination with an insert within the rubber tip to permit the rubber tip to be used while the anti-skid device is in place with the support. This combination, therefore, includes a hat shaped disc which is inserted within the rubber tip and which is allowed to remain in permanent association therewith. When the rubber tip is used with the support, the hat shaped member cooperates in functional relationship with the anti-skid device to prevent the anti-skid device from injuring the rubber tip while at the same time permitting a slight relative movement of the rubber tip with the bottom of the support in order to allow the rubber tip to rest in flat engagement with a supporting surface throughout a wide range of angular movement of the support. By this arrangement, a better gripping action results between the rubber tip and the supporting surface. It is understood that certain rubber tips include a rounded bottom portion. While the present invention is applicable to such tips it is believed well recognized that the flat bottom tip provides greater comfort and greater stability to the user of the support.

In the normal use of the support, the tip is positioned at the base of the support while the anti-skid device remains in fixed operable position within the tip. At such time when it is desired to utilize the anti-skid device it is merely necessary for the operator to slip the tip off the end of the support together with the hat shaped member, which is tightly associated therewith, and thereafter the support is ready for use with the anti-skid device.

It is, therefore, among the objects of my invention to provide a crutch, cane, or the like, with an anti-skid device which is permanently attached to such support; to provide such a device in which the rubber tip is protected from any cutting action by reason of the anti-skid device being attached to the support; to provide such a device in which a relative movement is permitted betwen the support and the rubber tip to allow differential angular positioning between the support and a flat based rubber tip; to provide such a device which may be easily and quickly installed in initial assembly; to provide such a device in which the anti-skid properties of the support may be utilized immediately upon removal of the rubber tip; and, to provide such a device which is efficient in operation and economical to manufacture.

These and other objects and advantages will appear more fully in the following detailed description when considered in connection with the accompanying drawing, in which:

Figure 1 is an exploded view of the elements constituting my invention;

Figure 2 is a longitudinal view, in section, of an assembly of my invention illustrated with a portion of a crutch, cane, or the like;

Figure 3 is a similar view illustrating the functional relationship of the device when subject to differential angular positioning; and, Figure 4 is a longitudinal view, in section, of the support and anti-skid device with the rubber tip removed.

Referring to the drawing, and in particular to Figure 1, I show, in an exploded view, the various elements constituting my invention. The reference character 1 illustrates a perspective view of the lower portion of a crutch, cane, or the like, hereinafter referred to as a support. A hole 2 is drilled axially into the base of the support 1. A cup-shaped member 3 forming a non-skid device includes a serrated edge, or a plurality of teeth 4. These teeth extend downwardly along the rim of the cup-shaped member 3. The diameter of the cup-shaped member is equal to or less than the diameter of the support 1. An aperture 5 extending axially through the cup-shaped member 4 provides for the reception of a wood screw 6 for securing the cup-shaped member to the support 1. A further element of the invention is a hat-shaped member 7 comprising a rim 8 and a crown 9. The top 10 of the crown 9 is semi-spherical in shape to provide, in effect, a ball joint against which the cup-shaped member 3 rests. Utilized also in combination with my invention is a conventional rubber or rubber-like tip 11 customarily used as a cushion element for the base of crutches, canes, or the like. The preferred form of tip 11 includes a flat bottom portion 12.

Figure 2 shows the various elements of my invention in assembly. The cup-shaped non-skid member is permanently secured to the bottom of the support 1 by means of the screw 6. The rim 8 of the hat-shaped member 7 is of such diameter that it fits tightly within the aperture 13 of the tip 11. It is intended that the hat-shaped member 7 be inserted into the aperture 13 of the tip 11 and that it remain a permanent or semi-permanent part of the tip 11.

Figure 3 illustrates the functional relationship between the elements of my invention in actual operation for use of the support 1. When a crutch or cane of this type is being used, there is a variable angular relationship between the flat base 12 of the tip 11 and the axis of the support 1. When such action occurs the cup-shaped member 3 is allowed to pivot about the semi-spherical portion 10 of the hat-shaped member 7 while maintaining an adequate ball-like joint support between the tip 11 and the support 1. By this arrangement, a protection is afforded to the teeth 4 while at the same time allowing substantial relative movement between the support 1 and the base of the tip 11. The result of this combination is to afford to the user of the crutch, or cane, a more natural condition as a means for assisting the user. When it is desired to utilize the support 1 on ice or a slippery supporting surface, it is merely necessary for the user to remove the tip 11 and use the support with the permanently attached non-skid cup-shaped member 3, as shown in Figure 4.

As thus shown and described, it is believed apparent that I have provided a novel and useful attachment for crutches, canes, or the like, which is simple and effective in operation, and which not only provides non-skid properties when desired, but also permits greater comfort and greater convenience in the normal use of the support. While I have described a preferred embodiment of my invention, it is to be understood that it is susceptible of those modifications which appear obviously within the spirit of the invention and as appearing within the scope of the appended claims.

Having thus described my invention what I claim and desire to protect by Letters Patent is:

1. The combination of a walking stick with a non-skid device comprising, a resilient cylindrical member having one enclosed end and constituting a tip adapted to engage with and be retained by the end of a walking stick, a cup-shaped member having serrated edges attached to the end of the walking stick, and a hat-shaped member interposed between the cup-shaped member and the end of said tip.

2. The combination of a walking stick with a non-skid device comprising, a resilient cylindrical member having one enclosed end and constituting a tip adapted to engage with and be retained by the end of a walking stick, a cup-shaped member having serrated edges attached to the end of the walking stick, and a hat-shaped member interposed between the cup-shaped member and the end wall of said tip, said hat-shaped member having an arcuate crown portion whereby to form a ball contact with the bottom of said cup-shaped member.

3. The combination of a walking stick with a non-skid device comprising, a resilient cylindrical member having one enclosed end and constituting a tip adapted to engage with and be retained by the end of a walking stick, a cup-shaped member having serrated edges attached to the end of the walking stick, and a hat-shaped member interposed between the cup-shaped member and the end wall of said tip and adapted to fit snugly within and be retained by said tip.

JAMES E. ALLAN.

REFERENCES CITED

The following references are of record in the file of this patent:

UNITED STATES PATENTS

| Number | Name | Date |
| --- | --- | --- |
| 616,738 | Schwarting | Dec. 27, 1898 |
| 2,116,941 | Francis | May 10, 1938 |